(12) United States Patent
Lerouge et al.

(10) Patent No.: US 8,719,947 B2
(45) Date of Patent: *May 6, 2014

(54) PROTECTION OF AUDIO OR VIDEO DATA IN A PLAYBACK DEVICE

(75) Inventors: Julien Lerouge, Santa Clara, CA (US); Gianpaolo Fasoli, Palo Alto, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,889

(22) Filed: Jul. 20, 2012

(65) Prior Publication Data

US 2012/0281828 A1    Nov. 8, 2012

Related U.S. Application Data

(63) Continuation of application No. 11/651,300, filed on Jan. 8, 2007, now Pat. No. 8,256,005.

(51) Int. Cl.
*G06F 7/00* (2006.01)

(52) U.S. Cl.
USPC .............................. 726/26; 713/168; 380/28

(58) Field of Classification Search
USPC .............................. 726/6, 26; 713/168; 380/28
See application file for complete search history.

(56) References Cited

U.S. PATENT DOCUMENTS

| | | | |
|---|---|---|---|
| 6,477,179 B1 * | 11/2002 | Fujii et al. | 370/466 |
| 6,507,950 B1 | 1/2003 | Tsukidate et al. | |
| 6,636,222 B1 * | 10/2003 | Valmiki et al. | 345/505 |
| 6,721,710 B1 | 4/2004 | Lueck et al. | |
| 6,842,522 B1 * | 1/2005 | Downing | 380/210 |
| 7,120,250 B2 * | 10/2006 | Candelore | 380/200 |
| 7,133,845 B1 | 11/2006 | Ginter et al. | |
| 7,356,144 B2 * | 4/2008 | Nishimoto et al. | 380/210 |
| 7,420,482 B2 | 9/2008 | Henry et al. | |
| 2002/0080282 A1 | 6/2002 | Rumreich et al. | |
| 2002/0141577 A1 | 10/2002 | Ripley et al. | |
| 2002/0154775 A1 * | 10/2002 | Yang | 380/236 |

(Continued)

FOREIGN PATENT DOCUMENTS

| | | |
|---|---|---|
| WO | WO-03/010722 A2 | 2/2003 |
| WO | WO-03/010722 A3 | 2/2003 |

(Continued)

OTHER PUBLICATIONS

International Search Report and Written Opinion mailed on May 9, 2008, for PCT Application No. PCT/US08/00057, 7 pages.

(Continued)

*Primary Examiner* — Beemnet Dada
*Assistant Examiner* — Sayed Beheshti Shirazi
(74) *Attorney, Agent, or Firm* — Adeli LLP

(57) ABSTRACT

Method and apparatus to prevent hacking of encrypted audio or video content during playback. Hackers, using a debugging attachment or other tools, can illicitly access encrypted data in memory in a playback device when the data is decrypted during playback and momentarily stored in digital form. This hacking is defeated here by methodically "poisoning" the encrypted data so that it is no longer playable by a standard decoder. The poisoning involves deliberate alteration of certain bit values. On playback, the player invokes a special secure routine that provides correction of the poisoned bit values, for successful playback.

29 Claims, 3 Drawing Sheets

(56) References Cited

U.S. PATENT DOCUMENTS

| | | | |
|---|---|---|---|
| 2002/0188570 A1* | 12/2002 | Holliman et al. | 705/57 |
| 2002/0194613 A1 | 12/2002 | Unger | |
| 2003/0035543 A1 | 2/2003 | Gillon et al. | |
| 2003/0081773 A1* | 5/2003 | Sugahara et al. | 380/44 |
| 2003/0200452 A1 | 10/2003 | Tagawa et al. | |
| 2003/0229489 A1 | 12/2003 | Mes | |
| 2004/0001693 A1* | 1/2004 | Cavallerano et al. | 386/68 |
| 2004/0049687 A1 | 3/2004 | Orsini et al. | |
| 2004/0161045 A1* | 8/2004 | Mizobata | 375/259 |
| 2004/0190872 A1 | 9/2004 | Loisel | |
| 2005/0089164 A1 | 4/2005 | Lang et al. | |
| 2005/0105809 A1* | 5/2005 | Abe et al. | 382/236 |
| 2005/0108612 A1 | 5/2005 | Downing | |
| 2005/0193205 A1 | 9/2005 | Jacobs | |
| 2005/0232595 A1* | 10/2005 | Hirai | 386/94 |
| 2005/0285975 A1 | 12/2005 | Spektor et al. | |
| 2006/0041576 A1* | 2/2006 | Ito | 707/102 |
| 2006/0069550 A1 | 3/2006 | Todd et al. | |
| 2006/0093142 A1* | 5/2006 | Schneier et al. | 380/251 |
| 2006/0200846 A1 | 9/2006 | Phan | |
| 2006/0222178 A1* | 10/2006 | Kuwabara et al. | 380/201 |
| 2006/0222330 A1 | 10/2006 | Lankford et al. | |
| 2006/0269222 A1* | 11/2006 | Horii | 386/83 |
| 2007/0091873 A1 | 4/2007 | Leblanc et al. | |
| 2007/0110237 A1 | 5/2007 | Tehranchi et al. | |
| 2007/0116128 A1 | 5/2007 | Evans | |
| 2007/0166002 A1* | 7/2007 | Mamidwar et al. | 386/83 |
| 2007/0217519 A1* | 9/2007 | Murayama et al. | 375/240.25 |
| 2007/0219934 A1* | 9/2007 | Wang et al. | 707/1 |
| 2007/0277039 A1* | 11/2007 | Zhao | 713/176 |
| 2008/0052516 A1* | 2/2008 | Tachibana et al. | 713/176 |
| 2008/0069340 A1* | 3/2008 | Vaughn | 380/28 |
| 2008/0165961 A1* | 7/2008 | Lerouge et al. | 380/202 |
| 2008/0247728 A1* | 10/2008 | Witham | 386/68 |

FOREIGN PATENT DOCUMENTS

| | | |
|---|---|---|
| WO | WO-03/060905 A1 | 7/2003 |
| WO | WO-2005/057535 A2 | 6/2005 |
| WO | WO-2005/057535 A3 | 6/2005 |

OTHER PUBLICATIONS

European Search Report and Search Opinion mailed on Jun. 19, 2008, for EP Application No. 08150036.5, filed on Jan. 3, 2008, 7 pages.

* cited by examiner

PROTECTION OF AUDIO OR VIDEO DATA IN A PLAYBACK DEVICE

CROSS-REFERENCE TO RELATED APPLICATION

This application is a continuation application of U.S. patent application Ser. No. 11/651,300 filed Jan. 8, 2007, now U.S. Pat. No. 8,256,005, the content of which is incorporated herein by reference in its entirety.

FIELD OF THE INVENTION

This invention relates to Digital Rights Management (DRM) for protection of audio and video data in a playback device such as a computer or audio or video media player, and especially to protection of such data from illicit copying.

BACKGROUND

The protection of digital content transferred between computers over a network and transferred from a computer to an associated playback device is important for many organizations. The DRM process often involves encrypting the pieces of content (e.g., encr the binary form of the content) to restrict usage to those who have been granted a right to the content, which is typically pieces of music or video programs.

Cryptography is the traditional protection method, but for many digital file transfer situations, a party that legitimately receives the content might try to break the DRM protection scheme, so as to give illicit access to third parties. An identified weak leak in the DRM security is in the overall process, rather than the encryption scheme. For instance, one of the more successful DRM systems distributes music and video content via the Internet. The DRM system distributes to a user's computer content that has been encrypted. The user's computer then decrypts the received content, generates local keys for encrypting the content, and uses these local keys to re-encrypt the content. Typically the content in encrypted form may also be downloaded, via a local connection, to an associated playback-only device such as an audio or video media player, which similarly decrypts and re-encrypts the content before playing same.

The present inventors have identified a potential security issue with this approach. As indicated above, during the playback process (which can also occur in the user's computer) the decrypted data is resident for a time in memory in the host computer and/or other playback device. One such memory location is a buffer memory which temporarily stores one or more packets or frames of the decrypted content bitstream. For audio content, the usual encoded format of the data is referred to as AAC (Advanced Audio Coding ISO 13818-7) which is a compression standard with associated codecs (coder-decoder) commercially available in hardware and software. For video, the usual encoded format is H.264, a similar standard with compression, also with commercially available codecs.

During the playback process, portions of the decrypted content (packets for audio, frames for video), are temporarily stored in a buffer prior to being supplied to the AAC or H.264 or other decoder. Hackers (illicit copiers) may be able to access the decrypted data in this buffer using a standard software tool known as a debugger attachment. The hacker can then copy the accessed data out of the buffer, store it, and as the content is played thereby have a decrypted copy of the entire content, without having to break the actual encryption.

This process is illustrated in FIG. 1, where a conventional video and/or audio player 10 is shown in a block diagram, with only relevant portions shown for simplicity. Note that player 10 may be part of a conventional computer, or a media player only, or part of a cell phone, PDA, or other electronic device. The encrypted content is stored in the non-volatile or other memory 12, which is for instance flash memory, a disk drive, etc. or DRAM (dynamic random access memory). When the user selects content (such as a song) for play, the song is transferred portion by portion (such as packet by packet) to decryptor 16, which applies a decryption key thereto and decrypts the portion. The decrypted data is then stored in a buffer (memory location) 18, designated here as a parser buffer. The parser buffer assembles the data into suitable packets for transfer to the AAC (or other standard type) decoder 20, which is part of a conventional codec.

The hacker's attack uses a debugger attachment 22 to access the data in buffer 18, and transfer it to another memory, such as in a computer (not shown), where he can effectively copy the entire content free of any encryption as it is played for later illicit distribution or use (it is assumed the content is copyrighted so the use is illicit, but that is not relevant technically).

SUMMARY

In accordance with this invention, the above hacker attack is prevented or defeated by "poisoning" the decrypted bit stream so it is unusable by the hacker, when he extracts it from the buffer memory. This poisoning process and the associated hardware and/or software to carry it out are resident in the playback device, such as a computer, dedicated media player, cell phone, PDA, etc. The poisoning process in one embodiment involves slightly modifying at least one portion of the decrypted data (such as one or more bits therein, the data being digital and in standard binary form), such as an AAC packet or H.264 frame, before transferring it to the decoder portion of the codec in the playback device. Thus the data when later intercepted by the hacker is unusable, since the nature of the modification is not known to him.

Of course, the associated decoder then is also modified so it can recover either the original data or some other piece of information which provides accurate decoding of the modified data. It is believed that the first option is less secure since then the original data must reappear during the decoding process, making it available to the hacker. The second option is believed to be more secure, avoiding this, but requires that the part of the decoding process using the other piece of information be executed, e.g. in software, in a secure manner or a secure location in the playback device (not accessible to the hacker) so the hacker cannot guess the original data.

DETAILED DESCRIPTION

The present method and associated apparatus has two phases. The first phase is to change the data, so it is modified (poisoned) to make it useless when later decoded by a standard decoder as used by a hacker. This usually happens when the data is first downloaded into the playback device, and stored in its transitory (e.g., volatile) memory. The second phase is to decode the data, typically during playback, to recover the data so it can be played.

The encoding operation is as follows:

1. The encrypted data (e.g. a song or video program) is downloaded from a server or host computer to the playback device, by conventional means.

2. The data is conventionally decrypted.

3. The resulting decrypted bitsteam is conventionally parsed into packets (each packet being a number of bits of predetermined length with header information).

4. The values of certain specific bit locations in each packet (or certain packets) are modified. The modifications are such that the resulting packet is parseable by a standard decoder, but not playable. Thus in one embodiment the bit modifications do not corrupt the structure of the audio packet (or video frame) itself.

5. In one embodiment, the original values of the modified bits are stored in a secure memory location in the playback device readable only by the DRM scheme associated with the device, and hence not accessible to the hacker. In a second embodiment, there is no storage of the modified bits.

6. In one embodiment, not every packet/frame (data portion) is so modified. This is accomplished by providing a set of rules (logic) which determines which portions are subject to modification. For instance, the AAC standard defines certain required blocks and optional blocks of bits. Required blocks include the section_data block, the scale_factor_data block, and the spectral_data block, while the pulse_data block and the tns_data blocks are optional. Hence in one embodiment the modifications of the bits are of those which are most likely to appear, and so poisoning the required blocks is preferred. Also, to speed up the encoding (enhance performance) in another embodiment a particular block may be poisoned (modified) only in certain cases. An example is to poison (in an AAC packet) the sect_cb bits in the section_data block only if the particular current window is of a certain length. Advantageously this may further confuse a hacker. Note the tradeoff here between performance (less poisoning) and security (more poisoning), to be selected for various implementations.

7. For the actual bit modification process, the value of each selected bit is replaced with a specific bit value, which preferably is a reserved (normally unused) value according to the relevant encoding standard. This enhances the later decoding, but has the drawback of weakening security since the hacker can more readily identify a poisoned portion of the data, although he would not know how to operate on such a bit even if he identified it.

Figure 1:
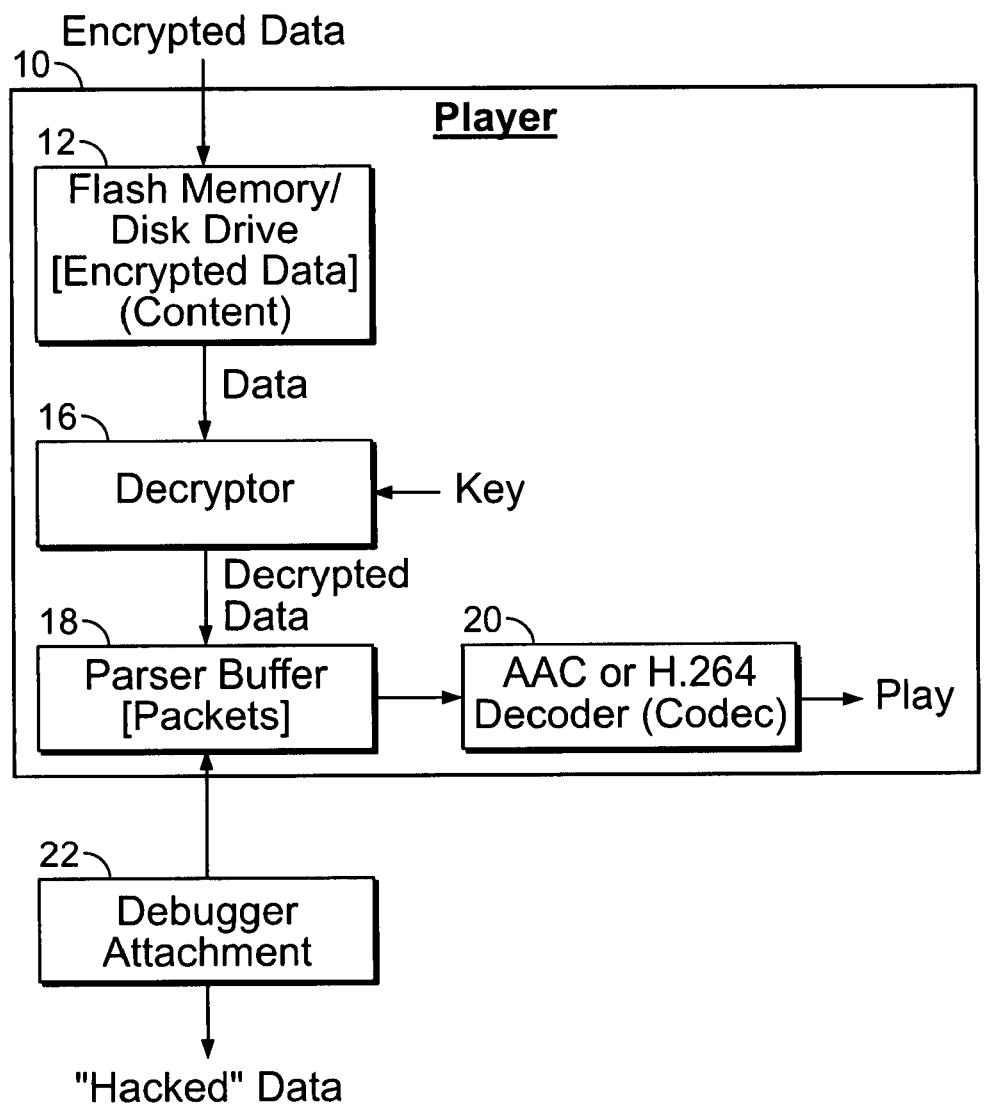
FIG. 1 depicts a hacking attack, to which this disclosure is directed to preventing.
Figure 2:
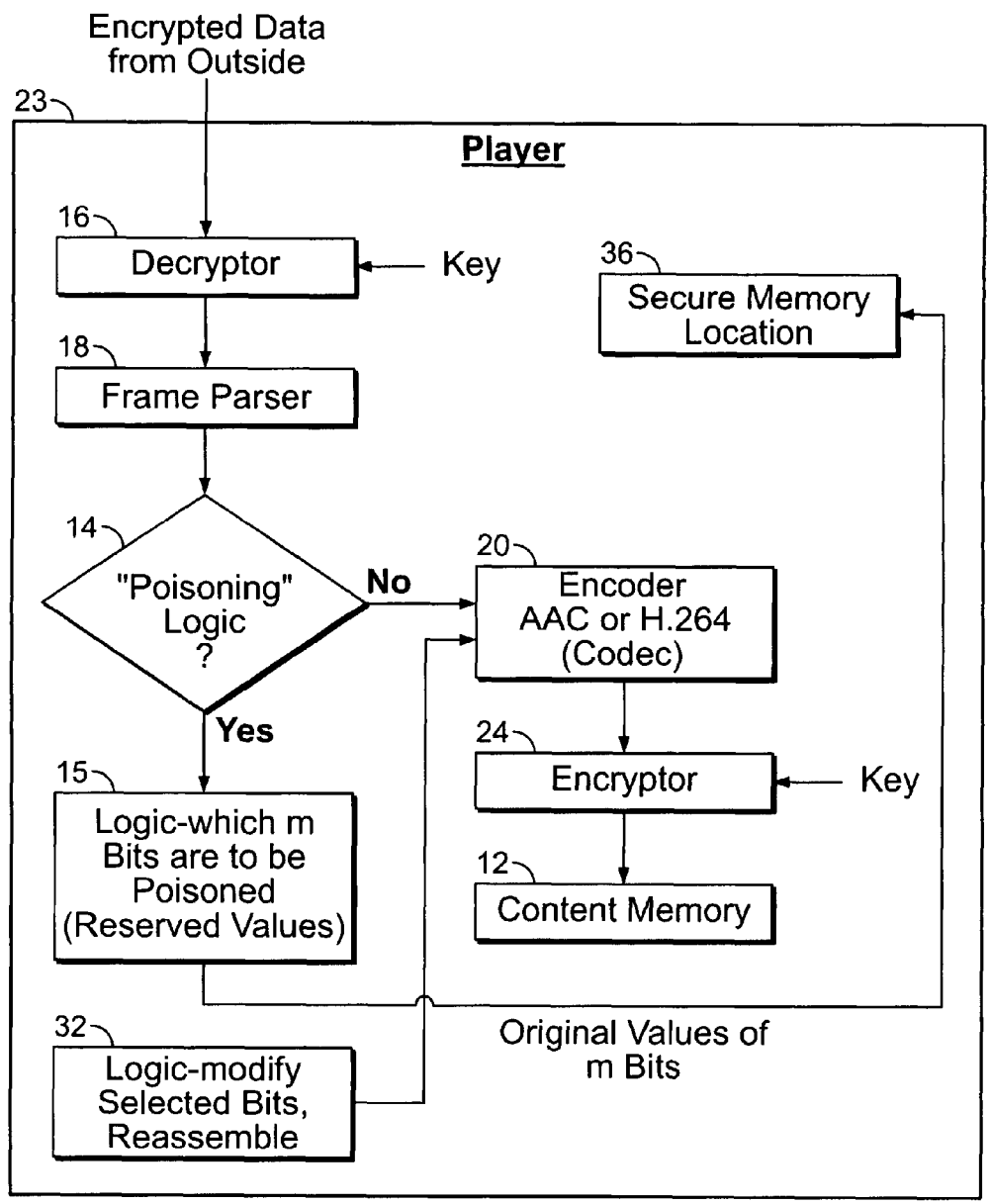
FIG. 2 depicts data encoding and storage in accordance with this disclosure.

This encoding process is illustrated in FIG. 2 which shows the encoding aspects of a player 23 having some elements the same as in FIG. 1. Here the encrypted data is received from an outside source; decrypted by decryptor 16 as in FIG. 1, and parsed by frame parser 18. Next, a new element is the poisoning logic 14 (embodied in hardware or software) which applies the above rules to determine if a particular portion of data is to be poisoned or not. If not, the portion of data is conventionally encoded by encoder 20, re-encrypted by encryptor 24, and stored in content memory 12.

If the logic 14 determines to poison a particular portion of the data, logic 15 as described above determines which bits m thereof are to be modified, and to what values. As described above, in one embodiment the original values of bits m are stored in secure memory location 36. Logic 32 then carries out the actual bit modifications, and reassembles the data portion (packet or frame, for instance.) The reassembled data portion is then transferred to encoder 20 for further conventional processing.

The decoding/playback process and associated apparatus 23' are as follows, and are complementary to the encoding process and apparatus, see FIG. 3. (Of course, the actual playback apparatus typically includes all elements of FIGS. 2 and 3.)

1. The previously stored and encrypted song or video program is conventionally downloaded from nonvolatile content memory 12.

2. The encrypted data is decrypted by decryptor 16, conventionally, and passed to frame parser 18.

3. Decoding logic 17, for each data portion, detects the reserved bit values at the predetermined bit locations. If no such reserved bit values are detected, processing defaults to the conventional decoding at coder 20 and playing. This means no bit poisoning was done on that frame/packet or other data entity.

4. If the reserved bit values are detected or any other pertinent information is detected, this means poisoning has taken place. The logic 17 then invokes (e.g. in software, but not so limited) a secure de-poisoning routine, which is stored in secure memory location 36. (Such a secure location is known in the DRM field and readily implemented by those skilled in the art.)

5. At this point, there are two options (embodiments.) In the first (path a in FIG. 3), the de-poisoning routine uses a routine to access the original bits (pre-poisoning) earlier stored in the secure memory location and in logic 44 substitutes those bits for the identified poisoned bits. This is the less secure approach as described above. In the second and more secure approach (path b in FIG. 3), the de-poisoning routine returns or invokes a modified decoder 42 and that modified decoder 42 performs the actual decoding, skipping decoder 20, and plays the content via the conventional audio/video circuitry, not shown.

Figure 3:
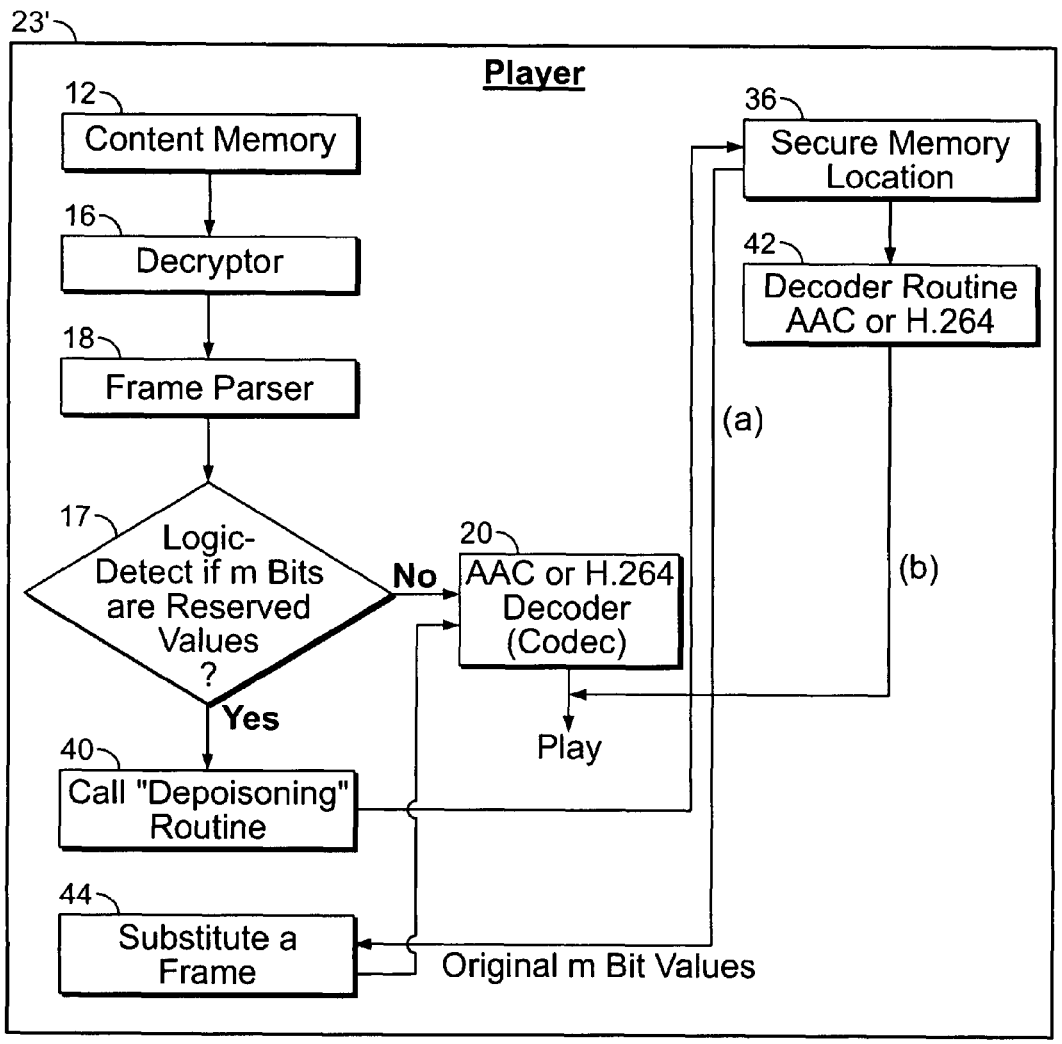
FIG. 3 depicts data decoding (playback) in accordance with this disclosure.

Both the above processes and associated apparatuses of FIGS. 2 and 3 are implemental in a combination of computer hardware and software, conventionally. The computer software is conventionally coded in the same language as used for the other portions of the DRM scheme resident in the playback device.

This disclosure is illustrative and not limiting; further modifications will be apparent to one skilled in the art in light of this disclosure and are intended to fall within the scope of the appended claims.

We claim:

1. A method for playing secure media content on a playback device, the method comprising:

receiving encrypted media content from storage in the playback device, wherein the encrypted media content is parsable but not playable when decoded by a decoder conforming to a predetermined media standard;

decrypting the encrypted media content;

parsing the decrypted media content into portions, wherein only predetermined portions have been modified and the modification does not corrupt a structure of the modified portions;

in each decrypted and parsed portion, detecting whether a value of at least one predetermined bit location matches a reserved value according to the predetermined media standard, so as to determine whether the portion has been modified;

when the detected value does not match the reserved value:
 decoding the portion using the decoder; and
 playing the decoded portion; and when the detected value matches the reserved value:
  accessing a routine from a secure memory location in the playback device;
  decoding the modified portion using the routine; and
  playing the decoded portion.

2. The method of claim 1, wherein each portion is a data frame or a data packet.

3. The method of claim 1, wherein the predetermined bit location is in at least one of a section data block, a scale factor block, and a spectral data block.

4. The method of claim 1, wherein the values of a plurality of predetermined bit locations are detected to determine a presence of a poisoning.

5. The method of claim 1, wherein decoding the modified portion using the routine comprises using a modified AAC or H.264 standard decoder which decodes the portion.

6. The method of claim 1, wherein decoding the portion using the routine comprises accessing data from the secure memory location to substitute for the value in the predetermined bit location.

7. A non-transitory computer readable medium carrying computer code for carrying out the method of claim 1.

8. A computer-enabled apparatus for carrying out the method of claim 1.

9. The method of claim 1, wherein the playback device is one of a computer, an audio player, and a video player.

10. The method of claim 1, wherein the values of at least one predetermined bit location are not detected.

11. The method of claim 1, wherein the predetermined bit location is in a data block which is specified by the predetermined media standard as being a required data block.

12. The method of claim 1, wherein the predetermined media standard is the AAC audio standard and each portion is a data packet having a plurality of data blocks comprising a section data block, and the predetermined bit location is in the section data block only if a current window of the media content is at least of a predetermined length.

13. An apparatus for playing secure media content, the apparatus comprising:
  a storage for storing encrypted media content wherein the encrypted media content is parsable but not playable when decoded by a decoder conforming to a predetermined media standard;
  a decryptor coupled to the storage to decrypt for decrypting the media content;
  a parser coupled to the decryptor for parsing the decrypted media content into portions, wherein only predetermined portions of the media content have been modified and the modification does not corrupt a structure of the modified portions;
  a logic element coupled to the parser for:
    determining whether a value of at least one predetermined bit location in each decrypted and parsed portion matches a reserved and normally unused value according to the predetermined media standard so as to determine whether the portion has been modified; and
    accessing a routine from a secure memory location in the apparatus in event of a match;
  wherein a modified portion is decoded for play using the routine, and
  wherein an unmodified portion is otherwise decoded for play by the predetermined media standard decoder which is coupled to the logic element.

14. The apparatus of claim 13, wherein each portion is a data frame or a data packet.

15. The apparatus of claim 13, wherein the predetermined bit location is in at least one of a section data block, a scale factor block, and a spectral data block.

16. The apparatus of claim 13, wherein the values of a plurality of predetermined bit locations are detected to determine a presence of a poisoning.

17. The apparatus of claim 13, wherein the routine is a modified AAC or H.264 standard decoder decodes the portion.

18. The apparatus of claim 13, wherein the routine for decoding a particular modified portion accesses data from the secure memory location to substitute for the value in the predetermined bit location of the particular modified portion.

19. A non-transitory computer readable medium carrying computer code for carrying out the apparatus of claim 13.

20. The apparatus of claim 13, wherein the apparatus is one of a computer, an audio player, and a video player.

21. A method of providing secure media content on a playback device, the method comprising:
  receiving encrypted media content from a source external to the playback device;
  decrypting the encrypted media content;
  parsing the decrypted media content into portions according to a predetermined media standard;
  in each portion, identifying according to a predetermined criteria whether a value of a predetermined bit location is to be modified; and
  when the value is to be modified, modifying the value of the predetermined bit location, wherein the modified portions are parsable but not playable when decoded by a decoder conforming to the predetermined media standard, the modification does not corrupt a structure of the modified portions, and the value of the modified predetermined bit location is a reserved value according to the predetermined media standard;
  reassembling the portion with the modified value;
  encoding the portion;
  re-encrypting the encoded portion; and
  storing the re-encrypted portion in memory in the playback device for later playback.

22. The method of claim 21, wherein the encoding is according to the AAC or H.264 standards.

23. The method of claim 21, wherein each portion is a data frame or a data packet.

24. The method of claim 21, wherein the predetermined bit location is in at least one of a section data block, a scale factor block, and a spectral data block.

25. A non-transitory machine readable medium carrying computer code for carrying out the method of claim 21.

26. A computer enabled apparatus for carrying out the method of claim 21.

27. The method of claim 21, wherein the playback device is one of a computer, an audio player, and a video player.

28. An apparatus for providing secure media content, the apparatus comprising:
  a port adapted to receive encrypted media content from a source external to the apparatus;
  a decryptor coupled to the port for decrypting the received media content;
  a parser coupled to the decryptor for parsing the decrypted media content into portions according to a predetermined media standard;
  a logic element coupled to the parser for identifying, according to a predetermined criterion, whether a value of a predetermined bit location in each portion is to be modified;

a secure memory location coupled to the logic element, wherein the logic element is further for:
modifying the value of the predetermined bit location according to a routine stored in the secure memory location, wherein the modified portions are parsable but not playable when decoded by a decoder conforming to the predetermined media standard, the modification does not corrupt a structure of the modified portions, and the modified value of the predetermined bit location is a reserved value according to the predetermined media standard; and
reassembling the portion;
an encoder coupled to the logic element for encoding the modified portion;
an encryptor coupled to the encoder for re-encrypting the encoded modified portion; and
a storage coupled to the encryptor for storing the re-encrypted modified portion for later playback.

29. An apparatus for playing media content, the apparatus comprising:
an input portion including:
a port adapted to receive encrypted media content from a source external to the apparatus;
a decryptor coupled to the port for decrypting the received media content;
a parser coupled to the decryptor for parsing the decrypted media content into portions according to a predetermined media standard;
a first logic element coupled to the parser for:
identifying, according to a predetermined criterion, whether a value of a predetermined bit location in each portion is to be modified;
modifying the value of the predetermined bit location, wherein the modified portions are parsable but not playable when decoded by a decoder conforming to the predetermined media standard, the modification does not corrupt a structure of the modified portions, and the value of the modified predetermined bit location is a reserved value according to the predetermined media standard; and
reassembling the portion;
a secure memo location coupled to the first logic element, wherein an original value of the predetermined bit location is stored in the secure memory location; and
an encoder coupled to the first logic element for encoding the modified portion;
an encryptor coupled to the encoder for re-encrypting the encoded modified portion; and
storage coupled to the encryptor for storing the re-encrypted modified portion for later playback; and
an output portion comprising a second logic element coupled to the parser for:
detecting the value of the at least one predetermined bit location in each portion;
determining whether the value of the at least one predetermined bit location matches the reserved value indicating a presence of the modification;
when the value of the at least one predetermined bit location matches the reserved value, accessing a routine from a secure memory location in the apparatus and decoding the portion for play using the routine; and
when the detected value does not match the reserved value, the portion is not decoded for play.

\* \* \* \* \*